United States Patent
Capizzo (10) Patent No.: US 7,602,143 B2
(45) Date of Patent: Oct. 13, 2009

(54) SYSTEM FOR REPLENISHING ENERGY SOURCES ONBOARD DIFFERENT TYPES OF AUTOMOTIVE VEHICLES

(75) Inventor: Peter David Capizzo, 2430 Audubon La., Hampton Cove, AL (US) 35763

(73) Assignee: Peter David Capizzo, Hampton Cove, AL (US)

( * ) Notice: Subject to any disclaimer, the term of this patent is extended or adjusted under 35 U.S.C. 154(b) by 210 days.

(21) Appl. No.: 11/556,415

(22) Filed: Nov. 3, 2006

(65) Prior Publication Data

US 2007/0113921 A1 May 24, 2007

Related U.S. Application Data

(60) Provisional application No. 60/733,472, filed on Nov. 4, 2005.

(51) Int. Cl.
*B60S 5/06* (2006.01)
*B65G 67/02* (2006.01)

(52) U.S. Cl. .......... 320/109; 104/34; 414/267; 414/331.02; 414/390; 414/398

(58) Field of Classification Search ........... 141/104, 141/231; 414/266–267, 273, 277, 331.01–331.06, 414/390, 398; 320/109, 138; 104/34
See application file for complete search history.

(56) References Cited

U.S. PATENT DOCUMENTS

| | | | | |
|---|---|---|---|---|
| 2,765,938 | A * | 10/1956 | Di Addezio | 410/24.1 |
| 4,708,175 | A | 11/1987 | Janashak et al. | |
| 4,724,875 | A | 2/1988 | Baldwin et al. | |
| 5,114,046 | A | 5/1992 | Bryant | |
| 5,187,423 | A * | 2/1993 | Marton | 320/109 |
| 5,405,713 | A * | 4/1995 | Pecherer et al. | 429/49 |
| 5,549,443 | A * | 8/1996 | Hammerslag | 414/809 |
| 5,585,205 | A * | 12/1996 | Kohchi | 429/99 |
| 5,595,224 | A | 1/1997 | Cutore | |
| 5,612,606 | A * | 3/1997 | Guimarin et al. | 320/109 |
| 5,668,460 | A * | 9/1997 | Lashlee et al. | 320/109 |
| 5,711,456 | A | 1/1998 | Bryant | |
| 5,711,648 | A * | 1/1998 | Hammerslag | 414/390 |
| 5,833,294 | A | 11/1998 | Williams et al. | |
| 5,927,938 | A * | 7/1999 | Hammerslag | 414/809 |
| 5,951,229 | A * | 9/1999 | Hammerslag | 414/398 |

(Continued)

*Primary Examiner*—Timothy L Maust
*Assistant Examiner*—Nicolas A Arnett
(74) *Attorney, Agent, or Firm*—Lanier Ford Shaver & Payne, P.C.

(57) ABSTRACT

A service station facility for replenishing various motivational energy sources onboard different types of automotive vehicles is disclosed herein. In one embodiment, the service station facility includes a rack, replaceable fuel tanks, a service module, and an electronic computer control system. The replaceable fuel tanks are stocked on the rack and substantially filled with various fluids, such as hydrogen, which are utile as motivational energy sources within fuel-operated automotive vehicles. The service module is mounted on the rack, and the electronic computer control system is connected in electrical communication with the service module. In this configuration, the service module is controllably operable to receive a depleted replaceable fuel tank from a fuel-operated automotive vehicle and also selectively deliver one of the filled replaceable fuel tanks onboard the automotive vehicle. In another embodiment, the service station facility may also stock replaceable batteries for selective delivery onboard battery-operated automotive vehicles.

18 Claims, 6 Drawing Sheets

U.S. PATENT DOCUMENTS

| | | | |
|---|---|---|---|
| 5,998,963 A * | 12/1999 | Aarseth | 320/109 |
| 6,014,597 A * | 1/2000 | Kochanneck | 701/22 |
| 6,094,028 A * | 7/2000 | Gu et al. | 414/282 |
| 6,157,162 A * | 12/2000 | Hayashi et al. | 320/104 |
| 6,173,941 B1 | 1/2001 | Johnston | |
| 6,237,647 B1 | 5/2001 | Pong et al. | |
| 6,394,151 B1 | 5/2002 | Donaldson et al. | |
| 6,619,333 B2 | 9/2003 | Swanson | |
| 6,655,424 B2 | 12/2003 | Kawazu et al. | |
| 6,695,019 B2 | 2/2004 | Hasenkopf | |
| 6,745,801 B1 | 6/2004 | Cohen et al. | |
| 6,755,225 B1 | 6/2004 | Niedwiecki et al. | |
| 6,786,245 B1 | 9/2004 | Eichelberger et al. | |
| 6,810,925 B2 | 11/2004 | Graham et al. | |
| 7,093,626 B2 * | 8/2006 | Li et al. | 141/231 |
| 7,168,465 B2 * | 1/2007 | Mitlitsky et al. | 141/231 |
| 7,201,384 B2 * | 4/2007 | Chaney | 180/68.5 |
| 7,258,184 B2 * | 8/2007 | Shorney et al. | 180/68.5 |
| 7,338,248 B2 * | 3/2008 | Buchmann et al. | 414/522 |
| 2002/0171236 A1 * | 11/2002 | Joitescu et al. | 280/834 |
| 2005/0029022 A1 * | 2/2005 | Kubusch et al. | 180/65.3 |

\* cited by examiner

SYSTEM FOR REPLENISHING ENERGY SOURCES ONBOARD DIFFERENT TYPES OF AUTOMOTIVE VEHICLES

CROSS REFERENCE TO A RELATED APPLICATION

The present application claims priority to U.S. Provisional Application Ser. No. 60/733,472, filed on Nov. 4, 2005 and entitled "Portable Energy Rack for Inserting and Charging."

FIELD OF THE INVENTION

The present invention generally relates to gas stations and service stations for automotive vehicles. The present invention more particularly relates to energy resource stations for different types of automotive vehicles such as, for example, electric, hydrogen, and fossil-fueled vehicles.

BACKGROUND OF THE INVENTION

In the future, as world oil supplies diminish or become more difficult to access, new types of fuels or energy storage cells such as batteries will have to be developed and integrated for use in automotive vehicles and also in the service stations of national transportation infrastructures. Though many alternative or replacement fuels are already currently under development, hydrogen fuel is presently considered by many to be the most practical. In fact, there is already a significant number of prototype hydrogen-fueled vehicles operating and in service on national roadways.

At the present time, however, a significant problem with utilizing hydrogen or any other type of alternative fuel or energy storage cell as a motivating power source onboard a vehicle is that there generally are no service stations or infrastructure to support the replenishing of such fuels or power sources. To remedy such a problem, it is projected that any transportation infrastructure developed to support the use of such alternative power sources onboard vehicles will have to do so at a pace generally in concert with the actual production of such alternative vehicles. That is, due to practical cost and inherent supply and demand matching concerns, such a pace is likely to be slow. In particular, the anticipated slow pace in developing and implementing such an alternative transportation infrastructure is likely to be reinforced by several hindering factors. Some of these factors may include, for example, the persistence of the oil industry even as it is somewhat phased out of operation (which may take many years), the high cost of the new fuel technology at low vehicle production volumes, and properly matching new vehicles' demand for such alternative fuels with service stations' capability to supply such alternative fuels. With particular regard to the last factor, a transportation infrastructure with too few alternative fuel service stations will somewhat deter persons from purchasing alternative fuel vehicles and thus hinder the demand for alternative non-fossil fuels. Also, if too few alternative fuel vehicles are purchased and operating on roadways, service station owners will then be slow to update their stations' infrastructures so as to accommodate such alternative fuel vehicles. Furthermore, in addition to these hindering factors, as new vehicle technology is developed and introduced for operating on such alternative fuels, the operating characteristics of such new vehicle technology is likely to initially vary widely before preferred vehicle standards are commonly established. This additional hindering factor thus initially works against establishing the complementary relationship that is generally necessary between infrastructure and alternative fuel type vehicles even more. For example, as new vehicle technology is initially developed and introduced for operating on such alternative fuels or power sources, there will be occasions wherein a driver of a new hydrogen-fueled car cannot find a service station along his route of travel that can replenish his car's hydrogen level. In another example, there will be occasions wherein a driver of a battery-operated car cannot find a service station that can recharge her car's battery.

The various energy storage cells onboard some alternative vehicles may particularly include batteries of the following type: nickel-cadmium type batteries, nickel/metal-hydride type batteries, silver-zinc type batteries, lead-acid type batteries, and lithium-ion type batteries. Hydrogen may be stored on alternative vehicles in either liquid or gaseous form within tanks or within various types of retention cells. Presently, there are several types of hydrogen retention materials being studied such as, for example, metal hydrides, sea salt, and also liquid carriers such as benzene, naphthalene, cyclohexane, and decalin. The advantage in utilizing such retention materials is their characteristic ability to accommodate both higher hydrogen densities and lower (i.e., safe) operating pressures while also enabling equivalent or better vehicle travel ranges that are common with more conventional vehicles that retain and operate on gasoline. The disadvantage, however, in utilizing such retention materials is the characteristically slow re-hydrogenation rate that is associated therewith. In particular, when utilizing such hydrogen retention materials, studies have shown that re-hydrogenation rates of up to 3 to 6 hours are generally necessary at safe pressures. Such re-hydrogenation rates or times are generally comparable to that of the time required to recharge a battery in a battery-operated vehicle, and such an excessive amount of charging time has historically inhibited wide introduction and use of battery-operated vehicles. In particular, when the battery of a battery-operated vehicle becomes discharged during use, the vehicle's driver must then discontinue driving the vehicle for a significant period of time while the vehicle's battery is recharged at a location with both a battery charger and space to park the vehicle (i.e., a charging site). In industry, to remedy such a problem, a driver of a battery-operated vehicle having a discharged battery typically switches vehicles by obtaining a replacement vehicle with a fully charged battery, or the driver may alternatively let the vehicle's battery recharge during off hours before driving the vehicle again on a subsequent workday. Such discontinuity in use of a battery-operated vehicle, however, is generally not practical for persons needing long-distance and/or frequent vehicle transportation.

Therefore, in view of the above, there is a present need in the art for a service station facility that is both equipped and able to replenish various motivational energy sources onboard different types of automotive vehicles in relatively short periods of time.

SUMMARY OF THE INVENTION

The present invention provides a service station facility for replenishing various motivational energy sources onboard different types of automotive vehicles. In one embodiment, the service station facility may include a rack, a plurality of replaceable fuel tanks, a service module, and an electronic computer control system. The replaceable fuel tanks are stocked on the rack and substantially filled with various fluids utile as motivational energy sources within fuel-operated automotive vehicles. The service module is mounted on the rack, and the electronic computer control system is connected in electrical communication with the service module. In this configuration, the service module is controllably operable to receive a depleted replaceable fuel tank from a fuel-operated automotive vehicle and also selectively deliver one of the filled replaceable fuel tanks onboard the fuel-operated automotive vehicle. In the same embodiment, the service station facility may optionally further include a plurality of replaceable batteries stocked on the rack for selective delivery onboard battery-operated automotive vehicles as well.

In another embodiment, the service station facility may include a rack, a plurality of fuel storage tanks, a fluid pumping system, a service module, and an electronic computer control system. The fuel storage tanks are mounted on the rack and adapted to retain various fluids utile as motivational energy sources within fuel-operated automotive vehicles. Both the fluid pumping system and the service module are mounted on the rack and connected in fluidal communication with the fuel storage tanks. The electronic computer control system is connected in electrical communication with both the fluid pumping system and the service module. In this configuration, the service module is controllably operable to establish fluidal communication with a fuel-operated automotive vehicle and also selectively deliver or inject one of the various fluids into a depleted fuel tank onboard the fuel-operated automotive vehicle. In the same embodiment, the service station facility may optionally further include an electric charging system for substantially charging discharged batteries onboard battery-operated automotive vehicles as well.

Furthermore, it is believed that various alternative embodiments of the present invention will become apparent to those skilled in the art when the detailed description of the best mode(s) contemplated for practicing the present invention, as set forth hereinbelow, is reviewed in conjunction with the appended claims and the accompanying drawing figures.

BRIEF DESCRIPTION OF THE DRAWINGS

The present invention is described hereinbelow, by way of example, with reference to the following drawing figures.

LIST OF PARTS AND FEATURES

To facilitate an understanding of the present invention, a list of parts and features highlighted with alphanumeric designations in FIGS. 1 through 7 is set forth hereinbelow.

8 service station facility (first embodiment as a towable trailer)
9 automotive vehicle
10 rack or framework
11 fuel tank(s) or energy cell(s)
12 robotic service module
13 electronic computer control system
14 hitch or tow bar
15 wheel(s) (mounted at the bottom of the rack)
16 conveyor system
17 electrolyzer system (for producing or generating hydrogen)
18 hose (for receiving water)
19 cable (for receiving electricity)
20 service station facility (second embodiment as in-ground facility)
21 electric charging system (for recharging batteries)
22 position sensor(s) (for alignment of robotic service module to automotive vehicle)
23 identification scanner or transceiver
24 control panel
25 display monitor
26 pay terminal
27 fuel storage tanks(s) (which may store, for example, hydrogen)
28 high-pressure fluid pumping system (for pumping fuel, for example, hydrogen)
29 battery (or batteries)
30 foldable ramp(s) (for automotive vehicle)
31 hydraulic lift system (for lifting and aligning the robotic service module)
32 service hole (in service platform)
33 fuel cell (which operates on hydrogen)
34 service platform (for automotive vehicle)
35 stabilizer(s)
36 rack-and-pinion mechanism (for adjusting the robotic service module)
37 permanent vehicle guide rail(s)
38 non-permanent hand rail(s) (which require assembly)
39 signaling device (for giving vehicle driving instructions such as go, slow, stop)
40 heating and cooling system
41 transfer manifold (of conveyor system)
42 quick disconnect (breaks before rotation)
43 quick disconnect (makes before rotation)
44 dual quick disconnect manifold
45 slip ring
46 hose wheel (of conveyor system)
47 high-pressure fuel supply line (from electrolyzer system)
48 fuel umbilical hose and/or electric cable
49 clamp(s)
50 transfer line(s) (for example, fuel refilling hoses and/or electric recharging cables)
51 holding clamp assembly (for conveyor system)
52 electric power connector
53 electric power input connector
54 fuel inlet port (passing, for example, hydrogen)
55 retention pin(s)
56 holding clamp(s)
57 quick disconnect(s)

58 electromagnetic actuator (for example, a quick disconnect solenoid)
59 electromagnetic driver (for example, a clamping solenoid)
60 power and status signal cable (for heating system)
61 bearing(s)
62 roller bearing(s)
63 roller assembly
64 railing (of conveyor system)
65 pull chain
66 sprocket wheel (for engaging pull chain)
67 front end axle of conveyor system (driven by an electric step motor)
68 cooling vent(s)
69 hook-up (for receiving water)
70 hook-up (for receiving electricity)
71 controllable robotic arm (for moving fuel tanks, fuel cells, and batteries)
72 positionable carriage (for supporting robotic arm)
73 electric motor (for positioning robotic arm carriage on rail system)
74 rail system (for moving robotic arm about the rack)
75 in-ground enclosure (made of, for example, fiberglass)
76 bay area (for refilling fuel tanks and fuel cells and/or recharging batteries)
77 compartment
78 power source (for electric heater)
79 utility trough (for umbilical hoses, refueling hoses, and electric charging cables)
80 liquidizer and refrigeration system (chiller)
81 rail system (for moving and positioning the robotic service module)
82 ground level
83 vehicle retention mechanism(s)
84 alignment pin(s)
85 electric torque motor(s)
86 electric motor
87 jackscrew
88 electric motor (for adjusting the robotic service module)
89 motor mount(s)
90 electric power input connector
91 fuel inlet port (passing, for example, hydrogen)
92 hose coupler

DETAILED DESCRIPTION OF THE INVENTION

Figure 1:
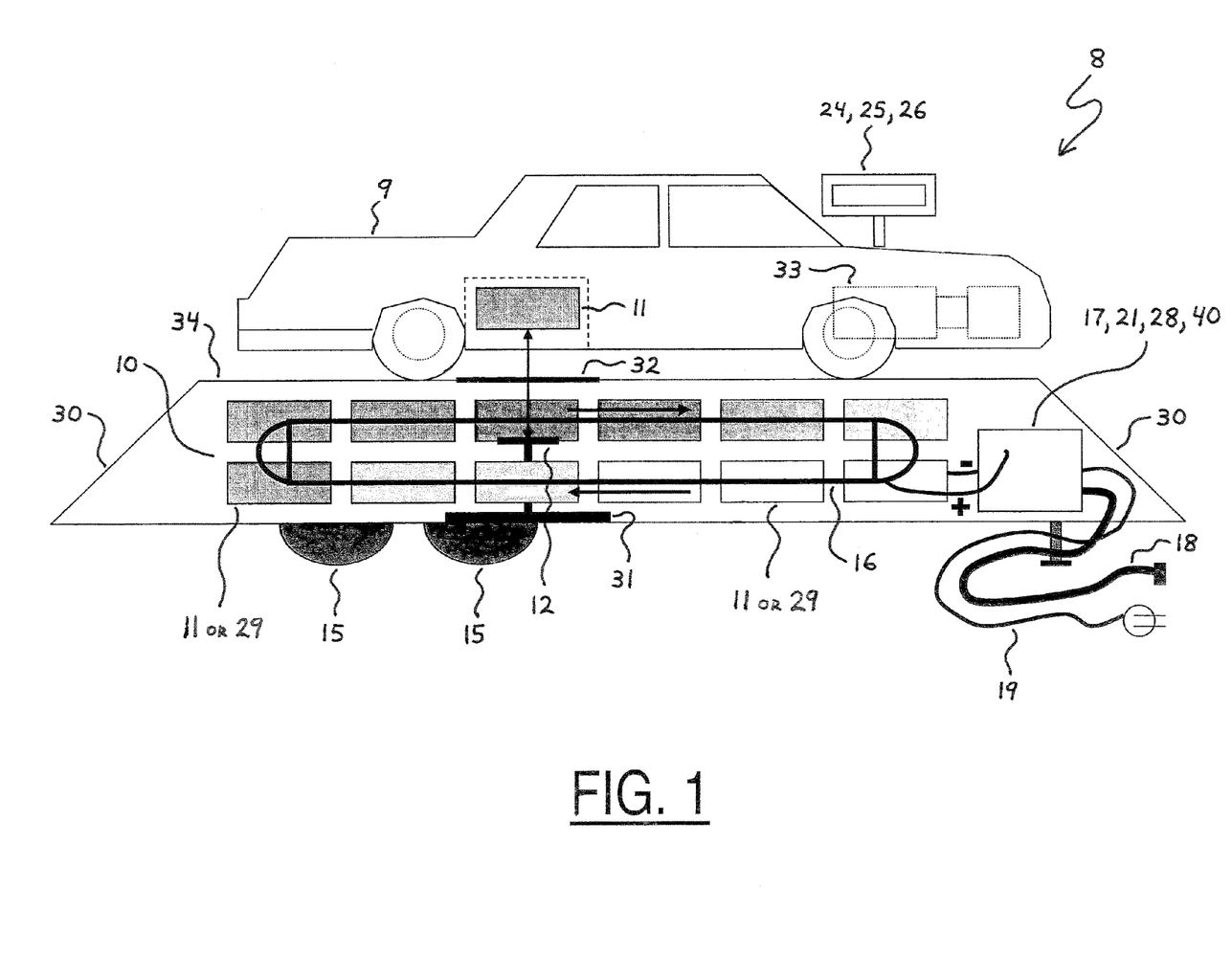
FIG. 1 illustrates a side view of one practicable embodiment of a service station facility for replenishing various motivational energy sources onboard different types of automotive vehicles.
Figure 2:
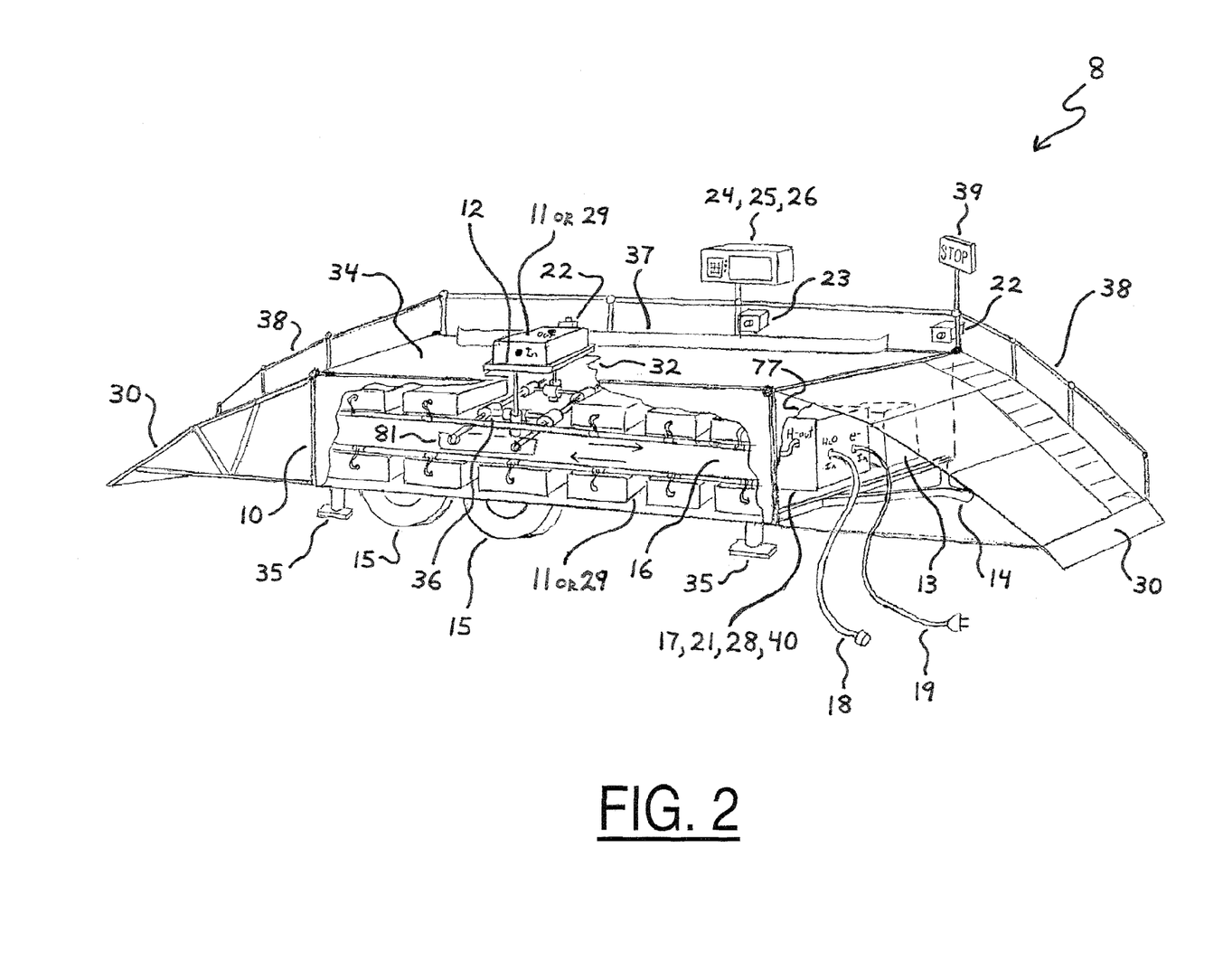
FIG. 2 illustrates a perspective view of the service station facility depicted in FIG. 1. In this view, the service station facility is partially cut away and shown to include a rack and a plurality of replaceable fuel tanks stocked on the rack by means of a circulating conveyor system.

FIGS. 1 and 2 respectively illustrate side and perspective views of one practicable embodiment of a service station facility 8 pursuant to the present invention. In general, the service station facility 8 is adapted for replenishing various motivational energy sources onboard different types of automotive vehicles.

As shown in FIGS. 1 and 2, the service station facility 8 includes a rack 10, a plurality of replaceable fuel tanks 11, a robotic service module 12, and an electronic computer control system 13. The replaceable fuel tanks 11 are stocked on the rack 10 and substantially filled with various fluids utile as motivational energy sources within fuel-operated automotive vehicles. The robotic service module 12 is adjustably mounted on the rack 10 via a hydraulic lift system 31, a rack-and-pinion mechanism 36, and a rail system 81. The electronic computer control system 13 is connected in electrical communication with the robotic service module 12 and its adjusting systems and mechanisms as well. In this configuration, the robotic service module 12 is controllably operable to remove a depleted replaceable fuel tank from a fuel-operated automotive vehicle 9 and also selectively install one of the filled replaceable fuel tanks 11 onboard the fuel-operated automotive vehicle 9. As used herein, the term "robotic" may include any electrically, mechanically, hydraulically, and/or pneumatically assisted arms or lever mechanisms, whether controlled by a computer, a human operator, or a combination of both computer and human operator.

In general, the replaceable fuel tanks 11 may be filled with many various types of fluids that are utile within fuel-operated automotive vehicles. As used herein, the term "fluid" may include either or both liquid and gaseous states, depending on context. Though other fluids are possible, some of these various fluids may particularly include, for example, biodiesel, bioethanol, biomethane, butanol, compressed air, compressed hydrogen, compressed natural gas, diesel, ethanol, gasoline, hydride, hydrogen, hythane, liquefied natural gas, liquid hydrogen, liquid nitrogen, methane, methanol, oxygen, P-series fuel, propane, vegetable oil, or some blend thereof.

As further shown in FIGS. 1 and 2, the service station facility 8 also includes a closed-loop conveyor system 16 on which the fuel tanks 11 are releasably held. The conveyor system 16 is mounted on the rack 10 and connected in electrical communication with the electronic computer control system 13. In this configuration, the conveyor system 16 is controllably operable to circulate the replaceable fuel tanks 11 about the service station facility 8 so that the robotic service module 12 has selective access to each of the fuel tanks 11.

As best shown in FIG. 2, the service station facility 8 further includes an electrolyzer system 17 for generating or producing hydrogen. The electrolyzer system 17 itself has both a hose 18 and a cable 19 for thereby receiving water and electricity from public utilities. The electrolyzer system 17 is connected in electrical communication with the electronic computer control system 13 and also controllably connectable in fluidal communication with any of the replaceable fuel tanks 11 on the conveyer system 16. In this configuration, the electrolyzer system 17 is controllably operable to receive both water and electricity to thereby produce hydrogen so as to substantially fill or refill any of the replaceable fuel tanks 11 on the conveyor system 16 that are designated for retaining hydrogen. Furthermore, it is to be understood that the electrolyzer system 17 for producing hydrogen, or any other fuel generation or storage system in general, may alternatively be situated in a second facility that is located near to the service station facility 8 and connected thereto via one or more fluid (for example, hydrogen) and/or electrical supply lines. Such an alternative arrangement may in some circumstances be desirable if a fuel generation or storage system is deemed to be too large to include within the service station facility 8. In this way, the service station facility 8 is still able to maintain its portability.

In addition to including the fuel tanks 11, the service station facility 8 also includes a plurality of replaceable batteries 29 stocked on the rack 10. In general, the batteries 29 are all substantially charged with electric charges that are sufficient and utile as motivational energy sources within battery-operated automotive vehicles. As depicted in FIGS. 1 and 2, the replaceable batteries 29 are releasably held on the conveyor system 16 along with the fuel tanks 11. In this configuration, the conveyor system 16 is controllably operable to circulate the replaceable batteries 29 about the service station facility 8 so that the robotic service module 12 has selective access to each of the batteries 29. In this way, the robotic service module 12 is controllably operable to remove a discharged replaceable battery from a battery-operated automotive vehicle and also selectively install one of the charged replaceable batteries 29 onboard the battery-operated automotive vehicle.

In general, the plurality of replaceable batteries 29 stocked on the rack 10 may include many different types of batteries that are utile within battery-operated automotive vehicles. Though other types of batteries are possible, some of these batteries 29 may particularly include, for example, a lead-acid type battery, a lithium-ion type battery, a nickel-cadmium type battery, a nickel/metal-hydride type battery, or a silver-zinc type battery.

As shown in FIGS. 1 and 2, the service station facility 8 further includes an electric charging system 21 for recharging any batteries 29 on the conveyor system 16 that are discharged. The electric charging system 21 is connected in electrical communication with the cable 19 for thereby receiving electricity from a public utility. In addition, the electric charging system 21 is connected in electrical communication with the electronic computer control system 13 and also controllably connectable in electrical communication with any of the replaceable batteries 29 on the conveyor system 16. In this configuration, the electric charging system 21 is controllably operable to substantially charge any of the replaceable batteries 29 on the conveyor system 16 that are designated for recharging.

As best shown in FIG. 2, the service station facility 8 further includes a plurality of wheels 15, a hitch 14, and one or more stabilizers 35. The hitch 14 is mounted on one end of the rack 10, and the wheels 15 are rotatably mounted at the bottom of the rack 10. In this configuration, both the hitch 14 and the wheels 15 facilitate towing of the service station facility 8 by, for example, a large truck. Whenever the service station facility 8 is unhitched, each stabilizer 35 helps balance and stabilize the service station facility 8 so that an automotive vehicle 9 can be safely driven up one of the ramps 30 and onto the facility's service platform 34 for service.

As further shown in FIG. 2, the service station facility 8 also includes one or more position sensors 22 and an electronic signaling device 39. The position sensors 22 and the signaling device 39 are all mounted at the top of the rack 10 and about the service platform 34. Both the position sensors 22 and the signaling device 39 are connected in electrical communication with the electronic computer control system 13. In this configuration, each position sensor 22 is controllably operable to sense the position of an automotive vehicle 9 relative to the service station facility 8 and its main service features, such as both the service hole 32 and the robotic service module 12 on the facility's service platform 34. In this way, proper alignment and controlled operation of the robotic service module 12 relative to the automotive vehicle 9 is facilitated while the automotive vehicle 9 is serviced on the platform 34. In this same configuration, the signaling device 39 further facilitates proper alignment between the automotive vehicle 9 and both the service hole 32 and the robotic service module 12 by displaying various driving instructions to the driver of the vehicle 9 as dictated by the position sensors 22. Some of the driving instructions displayed on the signaling device 39 may include, for example, "go," "slow," "stop," or even others.

In addition to the above, the service station facility 8 also includes a transceiver 23. The transceiver 23 is mounted at the top of the rack 10 and situated along one side of the service platform 34. The transceiver 23 is also connected in electrical communication with the electronic computer control system 13. Situated and connected as such, the transceiver 23 is controllably operable to establish electromagnetic communication with an automotive vehicle 9 to be serviced and thereby identify the vehicle 9 so that the robotic service module 12 can service the vehicle 9 accordingly. By initially identifying an automotive vehicle 9 in this way, the electronic computer control system 13 can control the robotic service module 12 so as to install the proper type of fuel tank 11 (containing the proper type of fuel) or the proper type of battery 29 into the vehicle 9.

As best illustrated in FIGS. 1 and 2, the service station facility 8 further includes a control panel 24, a display monitor 25, and a pay terminal 26. The control panel 24, the display monitor 25, and the pay terminal 26 are all mounted at the top of the rack 10 and situated along a side of the service platform 34. In addition, they are all connected in electrical communication with the electronic computer control system 13 as well. Situated and connected as such, the control panel 24 and the display monitor 25 facilitate controlled operation of the service station facility 8 by either a service attendant or a vehicle driver himself (i.e., self service). The pay terminal 26, in turn, facilitates on-the-spot payment for service by the driver of each automotive vehicle 9.

Figure 3:
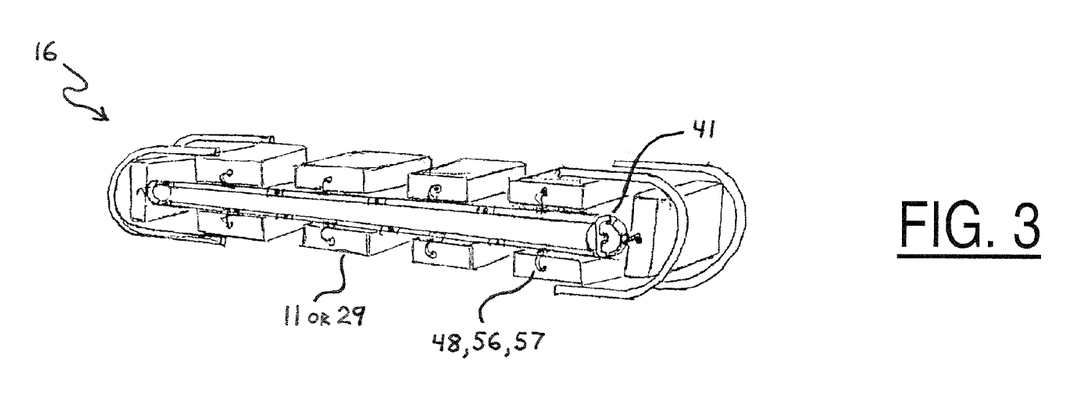
FIG. 3 illustrates a perspective view highlighting the circulating conveyor system depicted in FIG. 2.

FIG. 3 illustrates a perspective view of the conveyor system 16 depicted in FIG. 2. In this view, the two rotating end shafts, the semicircular end guide rails, the holding clamps 56, and the rotating transfer manifold 41 of the conveyor system 16 are all highlighted.

Figure 4:
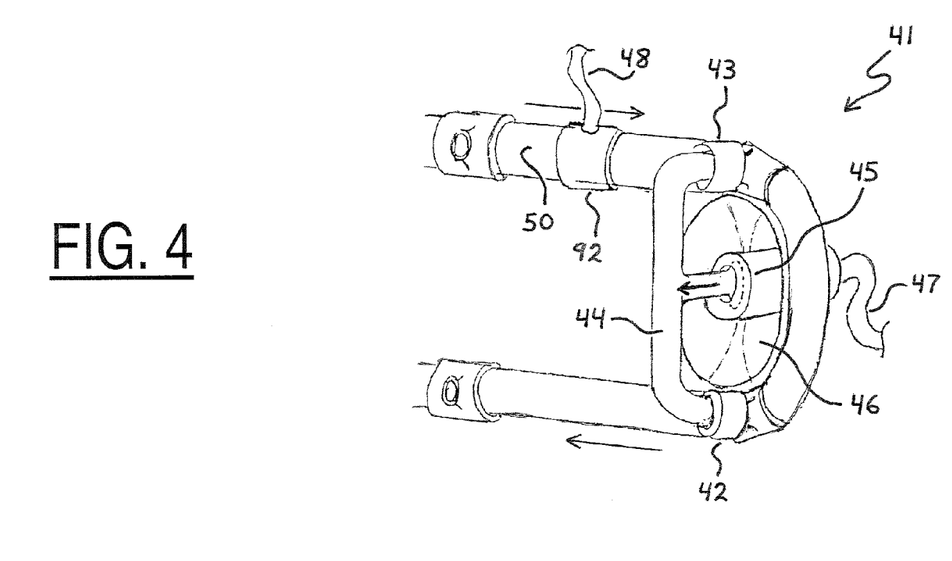
FIG. 4 illustrates a perspective view of a transfer manifold of the circulating conveyor system depicted in FIG. 3.

FIG. 4 illustrates a perspective view of the rotating transfer manifold 41 of the conveyor system 16 depicted in FIG. 3. In this view, the dual disconnect system of the transfer manifold 41 is highlighted. As shown in FIG. 4, the dual disconnect system particularly includes one make-before-rotate quick disconnect 43 and one break-before-rotate quick disconnect 42, which are situated 180 degrees away from each other about the transfer manifold's hose wheel 46. In general, such a dual disconnect system eliminates the need for a fuel fill-line hose to circulate with the conveyor system.

Figure 5:
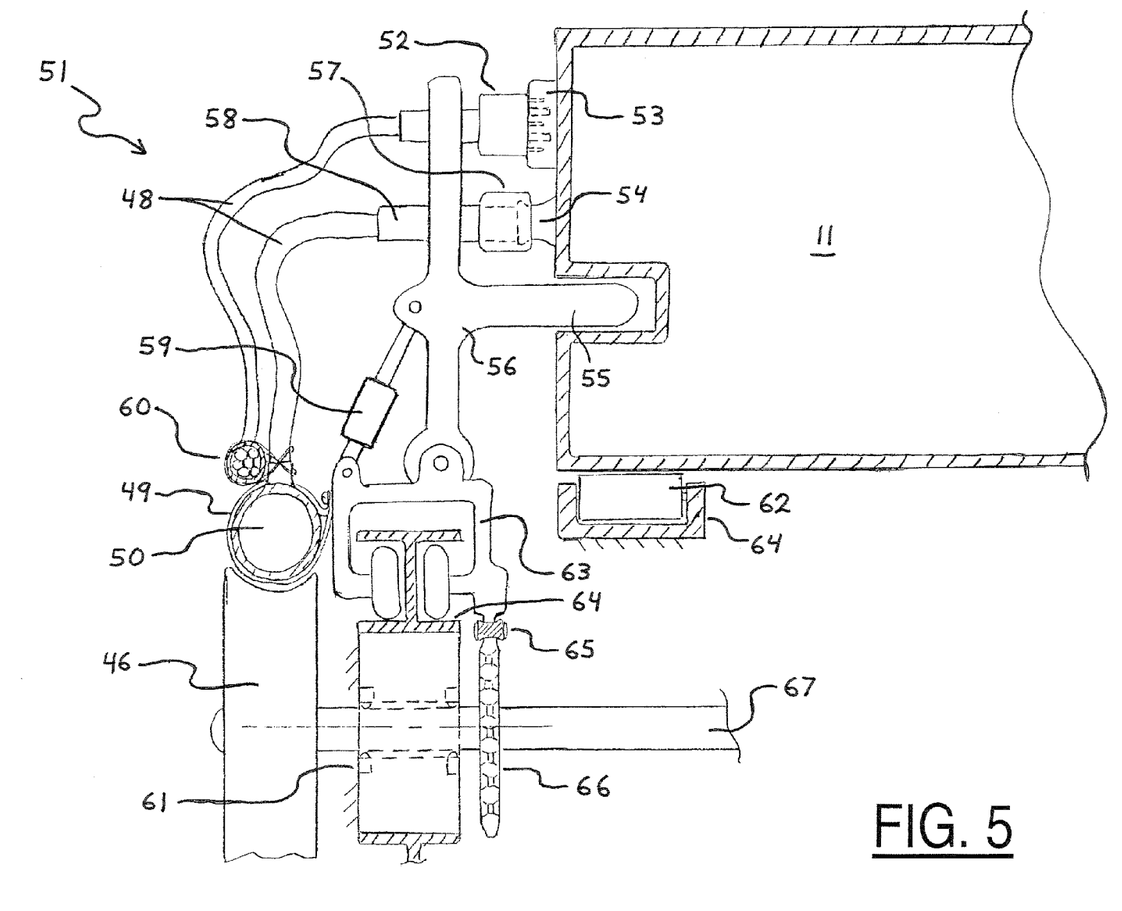
FIG. 5 illustrates a partial sectional view of a holding clamp assembly of the circulating conveyor system depicted in FIG. 3.

FIG. 5 illustrates a partial sectional view of one holding clamp assembly 51 of the circulating conveyor system 16 depicted in FIG. 3. In this view, the holding clamp assembly 51 is shown to ride on the railing 64 about the conveyor system 16 as driven by a pull chain 65 and a sprocket wheel 66. As further shown in the view of FIG. 5, the holding clamp 56 of the assembly 51 operates to both engage and lock onto a fuel tank 11 on the conveyor system 16 and also pull the fuel tank 11 around the conveyor system 16 so that the tank 11 rides on rail-mounted roller bearings 62. At about the same time that the holding clamp 56 of the assembly 51 locks onto the fuel tank 11, both a fluidal (i.e., fuel) connection and an electrical connection are respectively made with the fuel tank 11 via an electric power connector 52 and a quick disconnect 57. To later transfer the fuel tank 11 from the conveyor system 16 to the robotic service module 12 for installation onboard an automotive vehicle 9, both the fluidal connection and the electrical connection established by the holding clamp assembly 51 with the fuel tank 11 are broken so as to release the tank 11 from the conveyor system 16.

Figure 6:
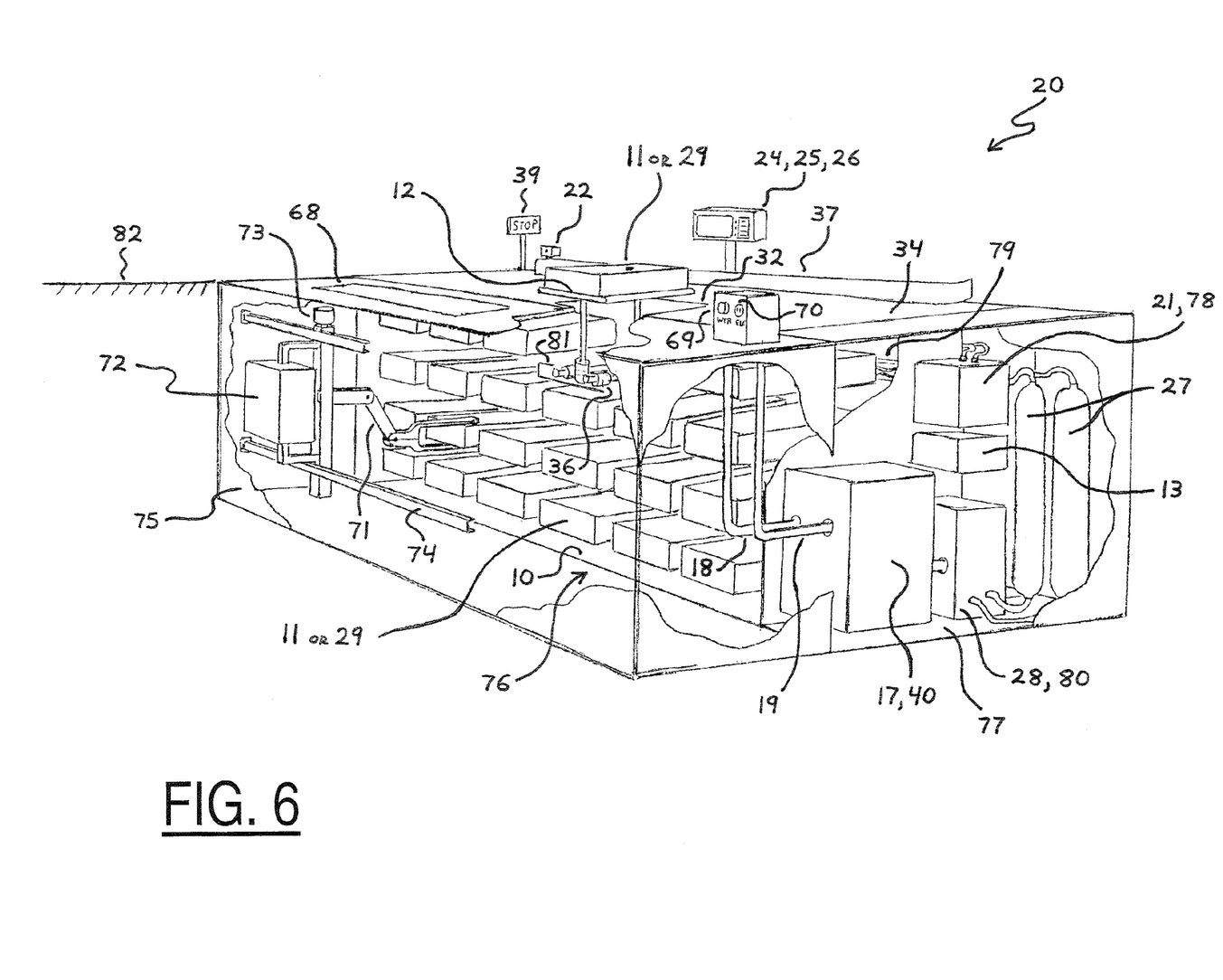
FIG. 6 illustrates a perspective view of another practicable embodiment of a service station facility. In this view, the service station facility is partially cut away and shown to include a rack and a plurality of replaceable fuel tanks stocked on the rack by means of a robotic arm engaged on a rail system.

FIG. 6 illustrates a perspective view of another practicable embodiment of a service station facility 20 pursuant to the present invention. In this view, the service station facility 20 is shown to be largely prefabricated and housed in an enclosure 75 that has been lowered into an excavated hole in the ground. As a result, the service station facility 20 has a service platform 34 that is substantially even with ground level 82.

In the embodiment depicted in FIG. 6, the service station facility 20 does not include a conveyor system for moving and stocking fuel tanks and batteries as does the facility 8 in FIGS. 1 and 2. Instead, the service station facility 20 includes a bay area 76 wherein both replaceable fuel tanks 11 and replaceable batteries 29 are stocked and stored on a shelf-like rack 10. To move the fuel tanks 11 and the batteries 29 about the facility's bay area 76 and both onto and off of the robotic service module 12, the service station facility 20 alternatively includes a controllable robotic arm 71 mounted on a carriage 72. The carriage 72 along with the robotic arm 71 are positionable about the facility's bay area 76 by means of a rail system 74. The carriage 72 is engaged on the rail system 74 and is moved thereon by an electric motor 73. The carriage 72 and its electric motor 73 are both connected in electrical communication with the facility's electronic computer control system 13 so as to control all movement of the robotic arm 71.

As further shown in FIG. 6, the service station facility 20 also includes a plurality of supplemental fuel storage tanks 27 and a high-pressure fluid pumping system 28. The fuel storage tanks 27 are mounted on the rack 10 and adapted to retain various fluids utile as motivational energy sources within fuel-operated automotive vehicles. One or more of the fuel storage tanks 27 themselves may initially be filled by an electrolyzer system 17 (in the case of hydrogen) connected thereto or by mobile tanks on trucks or railway cars. The fluid pumping system 28 is also mounted on the rack 10 and connected in fluidal communication with the fuel storage tanks 27. The electronic computer control system 13 is connected in electrical communication with the fluid pumping system 28. In this configuration, fluid (i.e., fuel) may generally be controllably pumped by the fluid pumping system 28 from the fuel storage tanks 27 and into the replaceable fuel tanks 11 in the bay area 76. Establishing a fluidal connection between one of the fuel storage tanks 27 and one of the replaceable fuel tanks 11 for successfully transferring fluid therebetween for refilling the tank 11 is particularly accomplished with help from the robotic arm 71.

In addition thereto, the service station facility 20 also includes an electric charging system 21. The electric charging system 21 is mounted on the rack 10 and connected in electrical communication with the electronic computer control system 13. In this configuration, electric current may generally be controllably communicated from the electric charging system 21 and into the replaceable batteries 29 in the bay area 76. Establishing an electrical connection between the electric charging system 21 and one of the replaceable batteries 29 for successfully transferring electric current therebetween for recharging the battery 29 is particularly accomplished with help from the robotic arm 71.

In a possible alternative embodiment, it is to be understood that the fuel storage tanks 27 may be directly connected in fluidal communication with the robotic service module 12 itself. In such a configuration, the robotic service module 12 would be controllably operable to establish fluidal communication with a fuel-operated automotive vehicle and also selectively inject one of the various fluids from the fuel storage tanks 27 directly into a depleted fuel tank onboard the vehicle. Similarly, it is to be understood that the electric charging system 21 may be directly connected in electrical communication with the robotic service module 12 as well. In this way, the robotic service module 12 would be controllably operable to establish electrical communication with a battery-operated automotive vehicle and also substantially recharge a discharged battery onboard the vehicle.

Figure 7:
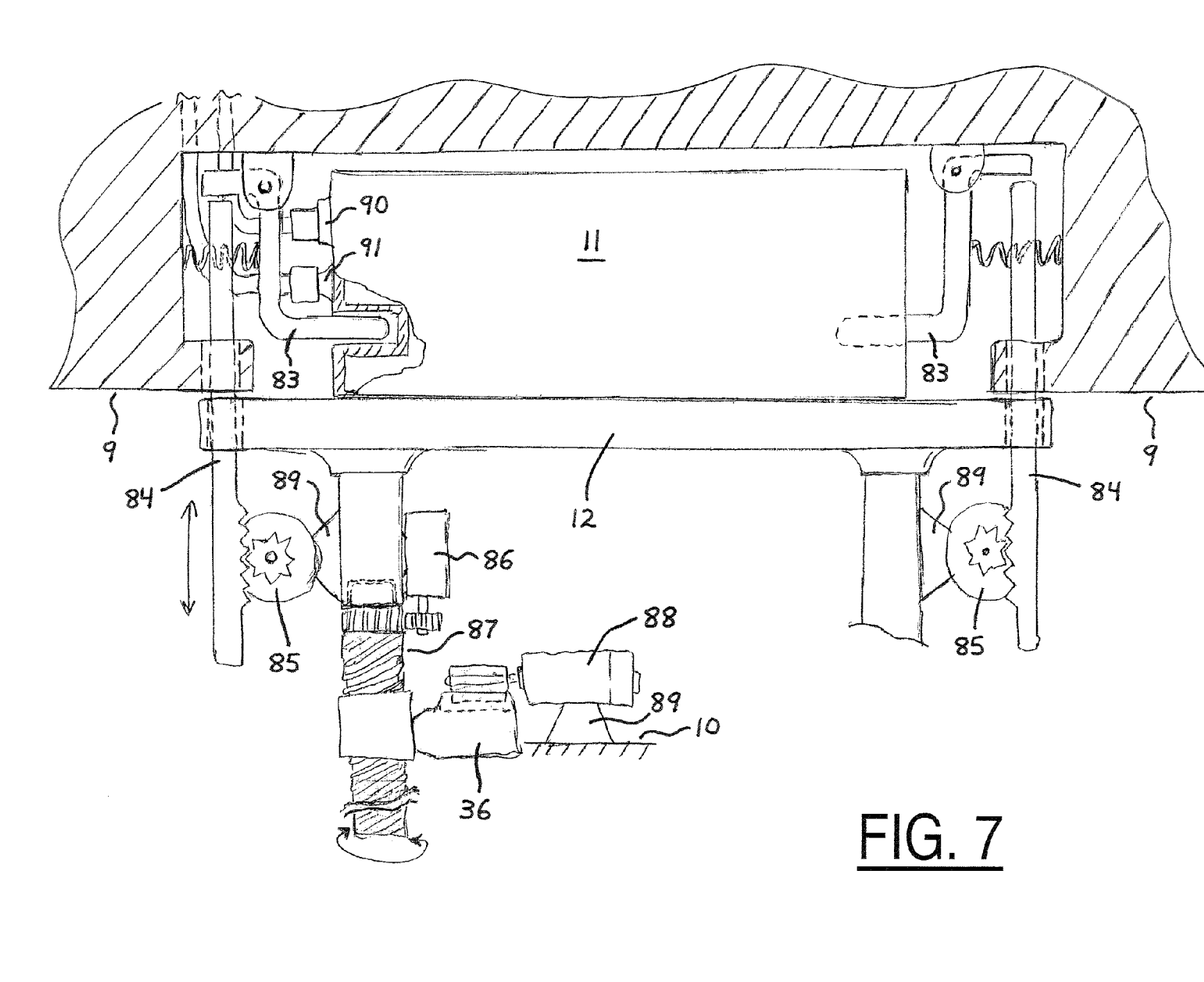
FIG. 7 illustrates a partial sectional view of a robotic service module mounted on the rack of the service station facility depicted in FIG. 6. In this view, the robotic service module is engaged underneath the fuel tank of an automotive vehicle being serviced.

FIG. 7 illustrates a partial sectional view of the robotic service module 12 adjustably mounted on the rack 10 of the service station facility 20 depicted in FIG. 6. In this view, the robotic service module 12 is engaged underneath the fuel tank 11 of an automotive vehicle 9 that is being serviced. As also shown in this view of FIG. 7, the automotive vehicle 9 includes one or more retention mechanisms 83 for releasably holding the fuel tank 11 in place after the tank 11 is installed by the robotic service module 12. As further shown in FIG. 7, the robotic service module 12 includes one or more electric torque motors 85 engaged with a matching number of vertical alignment pins 84, which ensure proper engagement of the service module 12 and the vehicle 9 while also releasing the retention mechanism 83. The jackscrew 87 and the electric motor 88 are used for moving the robotic service module 12 up and down with its fuel tank load. Equipped as such, the robotic service module 12 can thus remove a depleted fuel tank from the vehicle 9 and also install a full fuel tank 11. Furthermore, in FIG. 7, the robotic service module 12 is also shown to have both an associated rack-and-pinion mechanism 36 and an associated electric motor 88 mounted on the rack 10 of the service station facility 20. Together, the rack-and-pinion mechanism 36 and the electric motor 88 work to adjust and position the robotic service module 12 for proper lateral alignment with the automotive vehicle 9.

In general, the present invention as described hereinabove is able to supply both the appropriate fuel type and the appropriate fuel tank type at needed locations in a cost effective and timely manner. It is anticipated that the invention when properly implemented will help increase the pace at which hydrogen-fueled vehicles are adopted and favorably received by the general public.

In essence, the above-described service station facility 8 is a Portable Energy Rack for Inserting and Charging (PERIC) replaceable energy storage cells or devices such as batteries, fuel cells, fuel tanks, hydrogen tanks, and the like. The PERIC can be constructed to provide conventional tank refueling and battery recharging services in combination with tank and battery exchange capabilities.

A service station facility pursuant to the present invention may be a stationary or permanent structure like the above-described facility 20. It is anticipated, however, that the portable facility 8, which can easily be moved to locations in demand of a particular type of replaceable energy storage cell, will be highly functional and more effective in facilitating a transition from use of conventional vehicles to use of alternative fuel vehicles. The desirability of such facility portability is likely to result from the initial establishment of infrastructures that support the use of new energy sources in the transportation system too prematurely. That is, not only will there be a shortage of available service stations for the dispensing of new fuels or energy types, but as new energy technologies continue to develop, it is anticipated that alternative fuel service stations initially made available will suddenly become obsolete for the latest fuel type vehicle. Thus, initial use of new alternative fuel types is likely to vary widely from location to location geographically, depending perhaps on demographics such as urban or rural areas, or depending on the particular type of fuel technology that different states will choose to first promote.

The PERIC facility 8 can be made portable through use of any suitable transportation means, including being carried in or on cargo vehicles like semi trucks, train cars, or pallets of any kind. More practically, however, the facility 8 is best made portable by means of wheels 15 attached to its undercarriage, as in a trailer. Having such wheels 15 enables the facility 8 to be easily towed, moved, pulled, and ultimately parked by most any type of transportation means, including trucks, to desired locations in a timely and cost effective manner. Most presently existing gasoline service stations are adequately suited to accommodate the PERIC facility 8, in that the facility 8 will fit into most conventional filling stalls and only requires electrical and water hook-ups.

As also described hereinabove, a Stationary Energy Rack for Inserting and Charging (SERIC) replaceable energy storage cells or devices such as batteries, fuel cells, fuel tanks, and hydrogen tanks of various kinds is proposed herein as well. This type of service station facility 20 will become increasingly more desirable as the transportation industry both moves toward and settles on one primary type of vehicle energy system. The SERIC facility 20 is a stationary or permanent structure, which may be prefabricated and dropped into an excavated site, or into a previously excavated site, as old in-ground gasoline tanks are progressively removed from service stations. When utilizing such a service station facility 20, automotive vehicles may simply be driven onto a ground-level service platform 34 to be serviced.

The PERIC facility 8 and the SERIC facility 20 each include a sturdy framework or rack 10 that is able to support an automobile, a truck, or any vehicle of any kind or technology of mobility, to drive onto, or be pulled or pushed by external means onto, the top of the PERIC facility 8 or the SERIC facility's service platform 34. The facilities 8 and 20 may also be constructed to provide service to automotive vehicles positioned alongside each facility instead of on top each facility. In this way, the facilities 8 and 20 would each have vertical servicing capability.

The facilities 8 and 20 also incorporate within their respective structures a robotic servicing apparatus or service module 12 for refueling, or exchanging fuel or energy cells in automotive vehicles, automatically or autonomously. A single robotic service module 12 is generally employed to do both refueling and a tank or battery exchange, but two or more service modules may alternatively be installed wherein each service module is dedicated to a separate function. With removable fuel tanks or energy cells, the robotic service module 12 will be equipped with mechanisms for first decoupling a vehicle's fuel tank or energy cell, and then lowering it to a stowed position within the rack 10 for the purpose of refueling or recharging. Thereafter, the robotic service module 12 will reinstall a refilled/recharged tank/cell/battery into the automotive vehicle 9, thereby ensuring that the tank/cell/battery is connected properly and secure onboard the vehicle 9. Once servicing of the automotive vehicle 9 is completed, the customer driver's pre-serviced fuel tank level or battery charge is subtracted from the cost of a full tank or full battery charge. Furthermore, in the case of a vertically oriented system, the robotic service module 12 may either automatically or semi-automatically (i.e., assisted by a human operator) replace or replenish a desired fuel source.

The service station facilities 8 and 20 are constructed and designed to move their respective robotic service modules 12 to specific locations on a serviced automotive vehicle 9 where the vehicle 9 needs to be serviced. Alternatively or in combination therewith, the facilities 8 and 20 may also be constructed with means to position each vehicle 9 in a specific orientation on the rack 10 or service platform 34 for proper alignment, so as to service the vehicle 9 with a fuel tank, energy cell, or battery of any type as required by the vehicle 9. For example, in some constructed facility configurations, vehicles may be pulled up alongside the facilities 8 and 20, much like conventional gasoline station pumps. Thereafter, the tank/battery exchange or refueling/recharging may be carried out in either an automated or operator-assisted manner.

The refueling capability is accomplished by providing onboard fuel storage tanks 27, fuel transfer lines, electric cables, and fuel pumps or battery chargers and also cable hook-ups. The storage tanks 27 may be refilled by onboard fuel generators or electrolyzer systems 17. In addition thereto or alternatively, they may also be refilled via one or more external sources such as, for example, a tanker truck, a railway tanker, or even one or more stationary pipelines.

Primarily, or in combination, the service station facilities 8 and 20 are constructed to service vehicles with removable fuel cells, tanks, or energy storage devices such as batteries. The facilities 8 and 20 will contain within their respective mid sections a store of appropriate tanks or cells that are completely full or recharged, and will replace or exchange a vehicle's removed tank/cell with a pre-replenished one. Alternatively, the facilities 8 and 20 may be interfaced with an adjacent store or silo of tanks or cells for the exchange. In general, the exchange method implemented in these facilities 8 and 20 is highly efficient in that no refill/recharge time is required, which can take several minutes to hours, especially for batteries, in a more conventional facility. That is, in facilities 8 and 20, a customer may simply drive his vehicle 9 onto or alongside the service platform 34 of the facility, wait a few seconds for the exchange to take place, pay for the transaction, and then simply drive away. Such a brief and timely exchange is one of the most desirable aspects of both the PERIC/SERIC facilities 8 and 20, in that it promotes the use of, and further facilitates the transition to, a new fuel or energy technology such as, for example, hydrogen.

An example structure for the PERIC facility 8 is a rectangular framework or rack 10 that is constructed with a truss to support automotive vehicles 9 parked on top, to hold replaceable fuel cells stored in recharging bays, or to hold a rotating conveyer system 16 of cells. A rail system 81 for moving each of the robotic service modules 12, or a rail system 74 for moving the robotic arm 71 are each mounted to the respective framework or rack 10 of the service station facilities 8 and 20. Each framework or rack 10 also includes compartments 77 for refueling storage tanks 27, fuel generators or electrolyzer systems 17, heating and cooling units, and electronic computer control systems 13. Twin axial wheels 15 and stabilizers 35 are mounted to the undercarriage of the PERIC facility 8, along with a tow bar 14 mounted to the front, to thereby form a mobile trailer.

An example structure for the SERIC facility 20 is similar to the PERIC facility 8, except that the mobility aspect is not present in the SERIC facility 20. Instead, the SERIC facility 20 is constructed to be modular so that it can easily be placed into the ground using either a crane or a hoist at a desired destination site. The SERIC facility 20 is substantially enclosed with, for example, fiberglass walls for thereby withstanding any adverse effects from the elements of in-ground environments.

An electronic computer control system 13 is mounted within each facility's controls for thereby refueling or exchanging cells or tanks within vehicles. Mounted as such, the electronic computer control system 13 operates to control and monitor the recharging of spent cells or tanks, and also controls any communication links established between the service station facility itself, the automotive vehicles 9, and the control panel 24. The electronic computer control system 13 is loaded with autonomous software for the automatic or autonomous control of the overall facility. Such control may particularly include, for example, the positioning of the robotic service module 12 for proper vehicle alignment, the monitoring and moving of the fuel or cells to and from the vehicles, the assuring of proper connections of fueling hoses and cables for safe operation, and also the monitoring and controlling of communication interfaces between the facility itself, the vehicles 9, and the service control panels 24.

The electronic computer control system 13 interfaces with the facility's proximity or position sensors 22 for thereby determining the relative locations of vehicles 9, and the computer control system 13 also calculates the required repositioning for proper alignment. Such location information is also used to communicate directions to a user through the control panel's associated display monitor 25 and electronic signaling device 39 mounted on the front of the service station facility. The direction commands given by the signaling device 39 may instruct a vehicle driver to, for example, pull forward and stop as necessary for proper refueling or for a proper tank exchange to take place.

In addition to the above, each service station facility has means for interacting with and sensing the type of vehicles, to determining the fuel type requirement along with the quantity of fuel to be replenished, or the cell type and state of charge. The interaction protocol and identification code definitions may be developed by collaboration with the automobile industry via the Society of Automotive Engineers (SAE), for example. The vehicle codes can be attached to the vehicles in an established location in the form of magnetic strips or barcodes for reading by one or more sensors or transceivers 23 mounted on the facility. However, this type of link is limited in that no variable information can be transmitted from the vehicles to the facility about fuel or charge levels. A better alternative is for the facility and vehicles to have a communication link by means of infrared transceivers, electrical signal contacts, or wireless Radio Frequency Identification (RFID) means. These types of communication links can transmit the vehicle type, along with fuel type and level, or cell type and charge. The transmitted vehicle information is then communicated to the facility's electronic computer control system 13. The computer control system 13 may then control any actions necessary for properly servicing the vehicle.

If refueling, the level of refueling can be controlled by the vehicle driver himself, or by an operator or service attendant, via the control panel 24 mounted on the facility, with the control panel 24 more preferably made accessible to the driver near the vehicle's driver side window so as to obviate the driver's need to exit the vehicle. At or near the control panel 24, the driver may also pay for the fuel or tank exchange by means of a pay terminal 26 without having to exit the vehicle. In an alternative embodiment, a second control panel may be mounted on the side of the rack 10 for access by an operator, or by a driver who does exit the vehicle. Such an additional control panel may also be remotely operated via a cable or a wireless connection to the facility by a service attendant.

After the service station facility 8 has determined the vehicle fuel or cell requirements, the facility 8 will automatically move the robotic service module 12 to the fueling or exchange location on the vehicle, and autonomously exchange the cell, or refuel the vehicle. The exchange process is performed by removing the spent cell from the vehicle, and then placing it onto the conveyor system 16. A fresh cell is then rotated by the conveyor system 16 to the insertion position. In contrast, in the SERIC facility 20, the robotic arm 71 may move the cell to the bay area 76 for recharging, and the arm 71 may also retrieve a fresh unit for replacement and installation in the vehicle. In collaboration with the SAE, a standard retention mechanism 83, for example, may be defined for various types of cells or tanks so as to hold the cells or tanks in the undercarriage of their respective vehicles. The robotic service module 12 will achieve alignment with the vehicle retention mechanism 83 by means of the position sensors 22. The robotic service module 12 then engages the retention mechanism 83 via alignment pins 84, and then actively causes the retention mechanism 83 to release the cell or tank 11 from the vehicle 9. This can be accomplished, for example, by rotating a screw type locking bolt of the retention mechanism 83 by using an electric torque motor 85. The robotic service module 12 is maneuvered within the facility 20 also by electric motors on the rail system 81 via wheels or bearings. Alternatively, the robotic service module 12 may be positioned by a rack-and-pinion mechanism 36. Also, the robotic service module may lift and lower cells or tanks using another electric motor and a jackscrew lift, or alternatively a hydraulic jack lift system 31. The robotic arm 71 along with its carriage 72 may maneuver in a similar manner, except that the robotic arm 71 itself will perform the lowering, lifting, and placing of the cells or tanks into the bay area 76 for charging. The robotic arm 71 may be somewhat more versatile in that the interface definition of the individual cells and tanks can be somewhat varied and less narrowly defined. That is, given the robotic arm's dexterous clamp or claw on its distal end and also its intelligent controlling software, the robotic arm 71 may be utilized to grasp and move cells and tanks having multiple different configurations. In addition, the arm 71 could also be used by a human operator to aid or assist in positioning the cell or tank.

Alternatively or in combination with each robotic service module 12, the service station facilities 8 and 20 may be constructed with a movable service platform to help position the vehicles in a specific orientation for proper alignment. Such can be accomplished, for example, by using hydraulic cylinders or electric motors connected to a floating service platform on bearings. The cylinders would extend or retract as directed by the electronic computer control system 13. In such an embodiment, the computer control system 13 sends position commands to cylinder valve controllers and receives position feedback signals from position sensors on the service platform. A simpler method, however, would be to use a guide rail 37 mounted to the service platform 34. Such will force the vehicle driver to place the vehicle in an approximate initial alignment position. Thereafter, final alignment may easily be achieved via the mobility of the robotic service module 12 itself.

If a refueling process is required, the robotic service module 12 will autonomously connect a fueling hose or appendage as required to refuel the vehicle. This again, can be accomplished by defining interface requirements with the SAE, and having the service module 12 maneuver the hose with gears, levers, screws, and sensors in a predefined manner for positive engagement. A robotic arm with intelligent software, however, may again be a better approach for thereby ensuring versatile engagement capability.

Preferably, the vehicle fueling port would be located on the undercarriage of the vehicle, for ease and safety of the mating process, out of harms way for any persons on or around the facility, but such is not a necessary restriction. For side-mounted fueling ports on vehicles, the PERIC facility 8 will have side-mounted robotic service modules for vehicles to park alongside. For vehicles pulled on top of the PERIC/SERIC facilities 8 and 20, top-protruding side service modules 12 will be utilized. In general, side-fueling robotic service modules will operate and maneuver in a similar manner as the undercarriage-fueling service modules 12.

One method of stowing and refilling/recharging the tank/cell is for the facility to contain within its midsection, a conveyor system 16 to move the removed tanks/cells around a closed loop while being refilled/recharged. In this manner, the removed units are rotated out of the way, while the replenished units are simultaneously rotated into position for installation by the robotic service module 12. The length of the conveyor system 16, and consequently the number of stowed units, can be adjusted to meet the supply demand in concert with the refilling or recharging timing requirements.

In general, the conveyor system 16 includes a chain with holding clamps that automatically grasp the tank/cell when put in place by the robotic service module 12. Also mounted to the chain and split off to the clamps, are fuel umbilical hoses and/or electric cables 48 for refueling and recharging. The clamps are spaced on the chain with a spacing to accommodate the predefined tank/cell sizes. The clamp devices incorporate sensors to sense when a tank/cell is placed, triggering a clamping action. The clamping action is electromagnetically driven, but could be actuated by pneumatic means as well. The clamps also contain alignment sensors and quick disconnects for aligning and connecting the umbilical hose or cables 48. The umbilical devices will contain quick disconnects, connectors, or brushes as needed to temporarily connect the tanks/cells as they are placed and removed from the conveyor system 16 by the robotic service module 12. The clamps also contain electromagnetic actuators and sensors for aligning and establishing these temporary connections, which occurs after the clamping device confirms a positive tank/cell clamp.

The conveyor system 16 itself is rotated by an electric step motor, but can also be rotated by a hydraulic or pneumatic motor as well. Operation of the conveyor system motor is controlled by commands given by the electronic computer control system 13. The required fuel and charge is transferred from storage tanks and generators to the conveyor refueling and recharging hoses and cables, by a slip ring 45 mounted to a conveyor hose wheel 46 at one end of the conveyor system 16. Alternatively, the fluid and/or charge transfers can be done by a dual quick disconnect manifold with sensors and actuators similar in operation to the umbilical arrangement. During a rotational step of the conveyor system 16, one quick disconnect is maintained while the other is released. This method eliminates the need for a service transfer hose and cable that would need to circulate around with the conveyor system 16.

Another method of refueling and recharging the exchangeable tanks and cells is for the facility to contain a storage rack system (or bay area) either internally within or adjacent to the facility. The robotic service module 12 or robotic arm 71 would be controlled by electrical control signals communicated from the electronic computer control system 13, and would maneuver on rail systems as previously described herein. The computer control system 13 would receive charge level signals from sensors situated within the bay areas. Keeping track of charge levels enables the computer control system 13 to select a cell that meats a charge requirement of the customer. Such a system is more flexible in allowing the costumer to purchase not fully charged cells. In using a conveyor system, if a customer did not want to pay for a full tank/charge, the unit conveyor could be rotated to position a more recently removed tank/cell partially filled or charged for installation. This would put the charge levels out of sequence, and would require more conveyor rotations inbetween vehicles. These extra rotations would cause undesirable delays. Typically, however, full payments would not be a problem with credit cards, and these delays would not occur.

In general, there are two ways in which service station facilities can obtain required fuels or battery charges. They can be externally transferred to storage tanks and cells within the facilities for later transfer to the vehicle tanks and cells. Alternatively or in combination, the facilities contain onboard fuel and charge generators. For hydrogen generation, an electrolysis hydrogen generator (i.e., an electrolyzer system) is used that takes in facility water and electric power. The by-products are oxygen and heat, both of which are non-polluting exhaust. For gaseous or solid hydrogen retention tank recharging (as in metal hydrides), a high-pressure pump and buffer tanks are also employed. For liquid hydrogen, a chiller, insulated tanks, and a refrigerating system are used to liquefy the hydrogen and store it at low temperatures. Other types of source fuels can be used to generate hydrogen, such as methane or propane. But these all produce carbon-polluting byproducts, which is undesirable. The pollutants would need to be filtered or stored, and also disposed of, in an environmentally friendly fashion. For battery charging, battery charges are contained within the unit.

Currently, there are many off-the-shelf battery chargers and fuel generators commercially available. Any quantity or combination of such devices may optionally be included within either of the service station facilities 8 and 20 to generate the fuels and charges needed or required to service vehicle driver demand.

In summary, the PERIC facility 8 and the SERIC facility 20 generally act as universal fuel generators and storage facilities, and also generally provide a universal interface for various vehicle input needs, including inputs such as gasoline, diesel, hydrogen, natural gas, electricity, or others. The facilities 8 and 20 are generally equipped with universal adapters as needed to output the fuels and charges using connectors for interfacing with vehicles operable by any given fuel source. Additionally, the service station facilities 8 and 20 also perform an autonomous, semi-autonomous, automatic, or semi-automatic exchange of fuel tanks, cells or packs of any type, thereby simplifying, expediting, and making safer the energy input-output interface or transfer. The structure and function of the service station facilities 8 and 20 are to provide a energy delivery system that interfaces universally with these inputs, outputs, and also meets customer needs. Such is why the service station facilities proposed herein are so useful. In particular, simply replacing a hydrogen cell with a fully re-hydrogenated one generally eliminates any significant time period for waiting while a vehicle is serviced. That is, if the vehicles are properly constructed with replaceable tanks, cells, or batteries, and the machinery for performing the exchange is sufficiently robust, then such swapping can be accomplished with any type of tank, cell, or battery in a matter of seconds.

While the present invention has been described in what are presently considered to be its most practical and preferred embodiments or implementations, it is to be understood that the invention is not to be limited to the particular embodiments disclosed hereinabove. On the contrary, the present invention is intended to cover various modifications and equivalent arrangements included within the spirit and scope of the claims appended hereinbelow, which scope is to be accorded the broadest interpretation so as to encompass all such modifications and equivalent structures as are permitted under the law.

The invention claimed is:

1. A mobile service station facility for replenishing energy sources onboard different types of automotive vehicles said service station facility comprising:
  a portable rack having a service platform on which an automotive vehicle is to be positioned for replacement of a depleted storage device of said automotive vehicle;
  a single loop conveyor system mounted on said rack;
  a plurality of replaceable storage devices coupled to said conveyor a system and storing fluids or charges utile as motivational energy sources for automotive vehicles;
  a service module mounted on said rack, said service module controllably operable to receive said depleted storage device from said automotive vehicle and also to selectively deliver one of said replaceable storage devices for installation onboard said automotive vehicle; and an electronic computer control system connected in electrical communication with said service module and said conveyor system, wherein said conveyor system is controllably operable to circulate said replaceable storage devices about said service station facility beneath said service platform so that said service module has selective access to each of said replaceable storage devices, wherein at least one of said replaceable storage devices coupled to said conveyor system is positioned directly below said automotive vehicle when said automotive vehicle is positioned on said service platform for replacement of said depleted storage device, wherein said replaceable storage devices include at least a first replaceable storage device and a second replaceable storage device, and wherein said conveyor system is controllably operable to circulate said replaceable storage devices such that said second replaceable storage device passes under said first replaceable storage device while said first replaceable storage device is moving in a first direction and said second replaceable storage device is moving in a second direction.

2. The mobile service station facility according to claim 1, wherein said service station facility further comprises:
a hitch mounted on said rack; and
a plurality of wheels rotatably mounted on said rack, wherein both said hitch and said wheels facilitate towing of said service station facility.

3. The mobile service station facility according to claim 1, wherein said storage devices are filled with at least one fluid selected from a group consisting of biodiesel, bioethanol, biomethane, butanol, compressed air, compressed hydrogen, compressed natural gas, diesel, ethanol, gasoline, hydride, hydrogen, hythane, liquefied natural gas, liquid hydrogen, liquid nitrogen, methane, methanol, oxygen, P-series fuel, propane, vegetable oil, and a fuel blend.

4. The mobile service station facility according to claim 1, wherein said service station facility further comprises a recharging system.

5. The mobile service station facility according to claim 1, wherein the storage devices are rechargeable batteries.

6. The mobile service station facility according to claim 5, wherein said rechargeable batteries are selected from a group consisting of a lead-acid type battery, a lithium-ion type battery, a nickel-cadmium type battery, a nickel/metal-hydride type battery, and a silver-zinc type battery.

7. The mobile service station facility according to claim 5, wherein said service station facility further comprises an electric charging system connected in electrical communication with said electronic computer control system and controllably connectable in electrical communication with any of said rechargeable batteries that are designated for charging; wherein said electric charging system is controllably operable to substantially charge any of said rechargeable batteries designated for charging.

8. The mobile service station facility according to claim 1, wherein said service station facility further comprises: at least one position sensor mounted on said rack and connected in electrical communication with said electronic computer control system, wherein said position sensor is controllably operable to sense a position of said automotive vehicle relative to said service station facility so as to facilitate alignment and controlled operation of said service module relative to said automotive vehicle while said automotive vehicle is serviced.

9. The mobile service station facility according to claim 1, wherein said service station facility further comprises: a transceiver mounted on said rack and connected in electrical communication with said electronic computer control system; wherein said transceiver is controllably operable to establish communication with said automotive vehicle and to identify said automotive vehicle.

10. The mobile service station facility according to claim 1, wherein said service station facility further comprises: a service control panel connected in electrical communication with said electronic computer control system; a service display monitor connected in electrical communication with said electronic computer control system; and a pay terminal connected in electrical communication with said electronic computer control system.

11. The mobile service station facility according to claim 10, wherein said service station facility further comprises: a self-service control panel connected in electrical communication with said electronic computer control system; and a self service display monitor connected in electrical communication with said electronic computer control system.

12. The mobile service station facility according to claim 1, wherein said service station facility further comprises: an electrolyzer system connected in electrical communication with said electronic computer control system and controllably connected in fluidal communication with any of said replaceable storage devices that are designated for retaining hydrogen; wherein said electrolyzer system is controllably operable to receive both water and electricity to thereby produce hydrogen so as to substantially fill any of said replaceable fuel tanks designated for retaining hydrogen.

13. The mobile service station facility according to claim 1, wherein said rack has at least one ramp for enabling said automotive vehicle to reach said service platform.

14. The mobile service station facility according to claim 13, further comprising at least one wheel rotatably mounted on said rack.

15. The mobile service station facility according to claim 14, further comprising a hitch mounted on said rack.

16. The mobile service station facility according to claim 1, wherein said electronic computer control system is configured to receive data indicative of a vehicle type for said automotive vehicle and to select one replaceable storage device for installation onboard said automotive vehicle based on said data.

17. The mobile service station facility according to claim 16, wherein said data is wirelessly transmitted from said automotive vehicle.

18. The mobile service station facility according to claim 1, further comprising an energy replenishing system operable to replenish the energy storage devices on the conveyor system as the energy storage devices are circulated by the conveyor system.

* * * * *